United States Patent
Morrison

(10) Patent No.: US 9,644,426 B2
(45) Date of Patent: May 9, 2017

(54) NANOPARTICLE KINETIC GAS HYDRATE INHIBITORS

(71) Applicant: Halliburton Energy Services, Inc., Houston, TX (US)

(72) Inventor: Alexandra Clare Morrison, Inverurie (GB)

(73) Assignee: Halliburton Energy Services, Inc., Houston, TX (US)

( * ) Notice: Subject to any disclaimer, the term of this patent is extended or adjusted under 35 U.S.C. 154(b) by 275 days.

(21) Appl. No.: 14/514,841

(22) Filed: Oct. 15, 2014

(65) Prior Publication Data

US 2015/0027783 A1 Jan. 29, 2015

Related U.S. Application Data

(62) Division of application No. 13/343,820, filed on Jan. 5, 2012, now Pat. No. 8,887,815.

(51) Int. Cl.
| | |
|---|---|
| *E21B 21/00* | (2006.01) |
| *C09K 8/52* | (2006.01) |
| *E21B 7/00* | (2006.01) |
| *C09K 8/524* | (2006.01) |
| *C10L 1/16* | (2006.01) |
| *C10L 1/236* | (2006.01) |
| *C10L 3/10* | (2006.01) |
| *C10G 29/20* | (2006.01) |
| *E21B 21/08* | (2006.01) |

(52) U.S. Cl.
CPC .............. *E21B 7/00* (2013.01); *C09K 8/524* (2013.01); *C10G 29/20* (2013.01); *C10L 1/1658* (2013.01); *C10L 1/1675* (2013.01); *C10L 1/2368* (2013.01); *C10L 3/107* (2013.01); *E21B 21/001* (2013.01); *E21B 21/08* (2013.01); *C09K 2208/10* (2013.01); *C09K 2208/22* (2013.01); *C10L 2230/08* (2013.01); *C10L 2250/04* (2013.01); *C10L 2250/06* (2013.01); *E21B 2021/005* (2013.01); *Y10T 137/0391* (2015.04)

(58) Field of Classification Search
CPC ........................................................ C09K 8/52
See application file for complete search history.

(56) References Cited

U.S. PATENT DOCUMENTS

| | | | | |
|---|---|---|---|---|
| 5,639,925 | A * | 6/1997 | Sloan, Jr. ................. | C09K 8/52 137/13 |
| 5,905,061 | A | 5/1999 | Patel | |
| 5,977,031 | A | 11/1999 | Patel | |
| 6,093,862 | A * | 7/2000 | Sinquin .................... | C09K 8/52 137/13 |
| 6,451,892 | B1 * | 9/2002 | Bakeev .................. | C08K 5/053 137/13 |
| 6,828,279 | B2 | 12/2004 | Patel et al. | |
| 7,786,049 | B2 * | 8/2010 | Temple .................. | B82Y 30/00 166/305.1 |
| 8,887,815 | B2 | 11/2014 | Morrison | |
| 2004/0030206 | A1 * | 2/2004 | Dahlmann ............ | C08F 220/28 585/15 |

\* cited by examiner

*Primary Examiner* — Doug Hutton, Jr.
*Assistant Examiner* — Avi Skaist
(74) *Attorney, Agent, or Firm* — McDermott Will & Emery LLP

(57) ABSTRACT

Inhibiting gas hydrate formation while transporting hydrocarbon fluids may include providing a kinetic gas hydrate inhibitor, adding the kinetic gas hydrate inhibitor to a fluid capable of producing gas hydrates, and transporting the fluid that comprises the kinetic gas hydrate inhibitor. Generally a kinetic gas hydrate inhibitor may include a heterocyclic compound comprising nitrogen, e.g., poly(vinyl pyrrolidone).

13 Claims, No Drawings

NANOPARTICLE KINETIC GAS HYDRATE INHIBITORS

BACKGROUND

The present invention relates to methods of using kinetic gas hydrate inhibitors in subterranean operations.

Gas hydrates are a growing concern in oil or gas production at least in part because gas hydrates can present flow assurance problems in onshore wells, offshore wells, and pipelines. Gas hydrates are a common form of a unique class of chemical compounds known as clathrates, in which a rigid, open network of bonded host molecules enclose, without direct chemical bonding, appropriately sized guest molecules of another substance. In the case of gas hydrates, water acts as the host molecule, enclosing gas molecules such as methane, thereby yielding ice-like crystals of gas and water.

Gas hydrates normally are found in cold climates, in deepwater environments, or at any point in a gas system where the gas experiences rapid expansion. As this lattice expands and gains mass, it can block tubings, flow lines, pipelines, or any conduit through which produced gas flows such as a drill string or a blow out preventer.

As deepwater drilling and production increases, the problems associated with hydrate formation may increase. Deepwater is an ideal breeding ground for the growth of gas hydrates, and when these ice-like crystals form in the circulating system, attempts to manage them can be costly and dangerous. For the same reason, as operators search for hydrocarbons in colder regions such as Siberia, Alaska, and Canada, hydrates increasingly will become a cause of significant production problems.

Operators can take precautionary measures by reducing the water available for gas hydrate formation. For example, after a pipeline for the transportation of light hydrocarbons such as natural gas has been repaired, constructed, hydrotested, or otherwise exposed to water, it is mandatory that water remaining in the pipeline be removed. Light hydrocarbon gases are particularly susceptible to forming hydrates with water, which can and often do reduce or block the flow of gases through pipelines.

To solve gas hydrate problems, the industry traditionally uses thermodynamic chemistry to dissolve and inhibit hydrate formation. Gas hydrates offer two distinct problems for the scientists and engineers who design systems to mitigate the hydrate effect. The first problem concerns dissolution. When a hydrate plug forms, it must be melted to unblock the transmission conduit. For example, if a hydrate plug forms at the mudline in a deepwater completion, the operator must find a way to melt the ice plug in situ before production can proceed.

The second problem concerns inhibition. The goal is to prevent hydrate formation in the first place. However, to inhibit hydrate formation, the inhibitor must be present before a system reaches hydrate-forming conditions (e.g., low-temperature, high-pressure flow regimes). The traditional chemical approach to hydrate inhibition and dissolution has been to add sufficient quantities of a thermodynamic inhibitor to the production system. "Thermodynamic inhibition" refers to the chemicals' abilities to suppress the point at which hydrates will form. A thermodynamic inhibitor lowers the temperature at which hydrates form (at a constant pressure), but it may also increase the pressure at which hydrates form (at a constant temperature). By shifting the hydrate equilibrium toward higher pressure and lower temperature conditions, inhibitor chemicals make the water/gas system more resistant to hydrate formation.

However, mitigating the formation of gas hydrates with thermodynamic inhibitors requires significant quantities of the thermodynamic inhibitor. Methanol and glycols, usually ethylene glycol or triethylene glycol, are traditionally used as thermodynamic inhibitors. Because glycols can significantly increase the cost of a subterranean operation, their use is usually limited to facilities that include a glycol recovery or regeneration system. Further, because of the quantities of thermodynamic inhibitors that need be present, the compositions and concentrations of other additives in treatment fluids may be limited.

Thus, there is a need for improved methods of inhibiting gas hydrate formation in situ that requires less hydrate inhibitor and provides for more variability in the treatment fluid composition.

SUMMARY OF THE INVENTION

The present invention relates to methods of using kinetic gas hydrate inhibitors in subterranean operations.

In some embodiments, the present invention provides a method of transporting hydrocarbon fluids that comprises providing a gas hydrate inhibitor that comprises poly(vinyl pyrrolidone); adding the gas hydrate inhibitor to a fluid capable of producing gas hydrates; and transporting the fluid that comprises the gas hydrate inhibitor.

In other embodiments, the present invention provides a method of producing hydrocarbons that comprises providing a treatment fluid comprising a base fluid and a gas hydrate inhibitor that comprises poly(vinyl pyrrolidone); introducing the treatment fluid into a wellbore penetrating a subterranean formation; producing hydrocarbons from the subterranean formation; and allowing the gas hydrate inhibitor to inhibit the formation of gas hydrates.

In still other embodiments, the present invention provides a method of drilling that comprises providing a drilling fluid comprising a base fluid and a gas hydrate inhibitor that comprises poly(vinyl pyrrolidone) nanoparticles having an average particle size less than about 1000 nm; drilling a wellbore using the drilling fluid, the wellbore penetrating at least one zone of a subterranean formation that has a temperature of about 5° C. or less; and allowing the gas hydrate inhibitor to inhibit gas hydrate formation in at least a portion of the wellbore.

The features and advantages of the present invention will be readily apparent to those skilled in the art upon a reading of the description of the preferred embodiments that follows.

DETAILED DESCRIPTION

The present invention relates to methods of using kinetic gas hydrate inhibitors in subterranean operations.

The present invention provides kinetic gas hydrate inhibitors that require less inhibitor in a treatment fluid as compared to thermodynamic gas hydrate inhibitors. Further, the kinetic gas hydrate inhibitors may allow for increased variability in the composition and concentrations of additives in treatment fluids according to some embodiments of the present invention. Kinetic gas hydrate inhibitors slow the formation and growth of gas hydrates thereby allowing for longer times to transport fluids and/or produce fluids from a wellbore.

In some embodiments, a treatment fluid may comprise, consist essentially of, or consist of a base fluid and kinetic gas hydrate inhibitors. In some embodiments, kinetic gas hydrate inhibitors of the present invention may comprise, consist essentially of, or consist of heterocyclic compound comprising nitrogen. As used herein, the term "heterocyclic compound comprising nitrogen" refers to any compound whose molecules have a ring structure wherein at least one of the atoms in the ring is a nitrogen atom.

Suitable heterocyclic compounds comprising nitrogen for use in the present invention may include, but not be limited to, polymers comprising a vinyl pyrrolidone monomer unit, poly(vinyl pyrrolidone) homopolymers, poly(vinyl pyrrolidone) copolymers, poly(vinyl pyrrolidone) blend polymers and copolymers, poly(vinyl pyrrolidone) branched polymers and copolymers, poly(vinyl pyrrolidone) crosslinked polymers and copolymers, and the like, or any combination thereof. In some embodiments, a kinetic gas hydrate inhibitor of the present invention may comprise, consist essentially of, or consist of poly(vinyl pyrrolidone). In some embodiments, kinetic gas hydrate inhibitors of the present invention may comprise, consist essentially of, or consist of crosslinked poly(vinyl pyrrolidone).

In some embodiments, kinetic gas hydrate inhibitors of the present invention may comprise, consist essentially of, or consist of poly(vinyl pyrrolidone) nanoparticles. In some embodiments, poly(vinyl pyrrolidone) nanoparticles may have an average particle size ranging from a lower limit of about 1 nm, 5 nm, 10 nm, or 50 nm to an upper limit of about 1000 nm, 500 nm, or 100 nm, and wherein the average particle size may range from any lower limit to any upper limit and encompass any subset therebetween. In some embodiments, poly(vinyl pyrrolidone) nanoparticles may have an average particle size of 1000 nm or less. In some embodiments, poly(vinyl pyrrolidone) nanoparticles may have an average particle size of 400 nm or less.

Suitable poly(vinyl pyrrolidone) nanoparticles for use in conjunction with the present invention may include, but not be limited to, VIVIPRINT™ 540 (11% crosslinked poly(vinyl pyrrolidone) by weight water, available from International Specialty Products). In some embodiments, preferred crosslinkers may be chosen based on environmental regulations in a region of interest, e.g., degradability.

In some embodiments, kinetic gas hydrate inhibitors of the present invention may comprise, consist essentially of, or consist of poly(vinyl pyrrolidone) according to any embodiment described herein and rubber latex. In some embodiments, kinetic gas hydrate inhibitors of the present invention may comprise, consist essentially of, or consist of poly(vinyl pyrrolidone) and rubber latex nanoparticles. One of ordinary skill in the art will recognize the suitability of a nanoparticle source comprising rubber latex where use of a drilling fluid may be subject to environmental restrictions, and should make appropriate adjustments to the compositions or methods of the present invention. A variety of nanoparticle sources comprising rubber latex may be used in conjunction with the present invention, including both synthetic and natural rubbers in latex form, where such rubber latexes are commercially available as aqueous dispersions and/or emulsions.

In some embodiments, kinetic gas hydrate inhibitors of the present invention may comprise, consist essentially of, or consist of poly(vinyl pyrrolidone) according to any embodiment described herein and emulsion-polymerized copolymers of 1,3-butadiene and styrene. In some embodiments, kinetic gas hydrate inhibitors of the present invention may comprise, consist essentially of, or consist of poly(vinyl pyrrolidone) and nanoparticles of emulsion-polymerized copolymers of 1,3-butadiene and styrene. Suitable nanoparticles of emulsion-polymerized copolymers of 1,3-butadiene and styrene for use in conjunction with the present invention may include, but not be limited to, TECHWAX™ FL250 (about 68% of emulsion-polymerized copolymers of 1,3-butadiene and styrene by weight water, available from Techwax, Ltd.).

In some embodiments, kinetic gas hydrate inhibitors of the present invention may comprise, consist essentially of, or consist of poly(vinyl pyrrolidone) according to any embodiment described herein and anti-agglomerates. Suitable anti-agglomerates for use in conjunction with the present invention may include, but not be limited to, zwitterionic surfactants, zwitterionic polymers, amphoteric polymers, alkylamide surfactants, polypropoxylates, and the like, or any combination thereof.

In some embodiments, kinetic gas hydrate inhibitors of the present invention may comprise, consist essentially of, or consist of poly(vinyl pyrrolidone) according to any embodiment described herein, rubber latex according to any embodiment described herein, and emulsion-polymerized copolymers of 1,3-butadiene and styrene according to any embodiment described herein.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, kinetic gas hydrate inhibitors of the present invention may be included in the treatment fluid in an amount ranging from a lower limit of about 0.0025%, 0.01%, 0.1%, or 0.5% to an upper limit of about 5%, 1%, or 0.1% by volume of the treatment fluid, and wherein the amount of kinetic gas hydrate inhibitors may range from any lower limit to any upper limit and encompass any subset therebetween.

Suitable base fluids for use in conjunction with the present invention may include, but not be limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, potassium chloride, calcium bromide, zinc bromide, potassium carbonate, sodium formate, potassium formate, cesium formate, sodium acetate, potassium acetate, calcium acetate, ammonium acetate, ammonium chloride, sodium bromide, ammonium bromide, sodium nitrate, potassium nitrate, ammonium nitrate, ammonium sulfate, calcium nitrate, sodium carbonate, and potassium carbonate; any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base treatment fluid, where the amount may range from any lower limit to any upper limit and encompass any subset therebetween. Examples of suitable invert emulsions include those disclosed in U.S. Pat. No. 5,905,061, U.S. Pat. No. 5,977,031, and U.S. Pat. No. 6,828,279, each of which are incorporated herein by reference. It should be noted that for water-in-oil and oil-in-water emulsions, any mixture of the above may be used including the water being and/or comprising an aqueous-miscible fluid.

In some embodiments, treatment fluids of the present invention may have a density ranging from about 7 lbs/gallon to about 22 lbs/gallon.

In some embodiments, treatment fluids of the present invention may include additives. Suitable additives for use in conjunction with the present invention may include, but not be limited to, salts; weighting agents; inert solids; fluid loss control agents; emulsifiers; dispersion aids; corrosion inhibitors; emulsion thinners; emulsion thickeners; viscosifying agents; gelling agents; high-pressure, high-temperature emulsifier-filtration control agents; surfactants; particulates; proppants; gravel particulates; lost circulation materials; foaming agents; gases; pH control additives; breakers; biocides; crosslinkers; stabilizers; chelating agents; scale inhibitors; thermodynamic gas hydrate inhibitors; second kinetic gas hydrate inhibitors; mutual solvents; oxidizers; reducers; friction reducers; clay stabilizing agents; and the like; or any combination thereof. One skilled in the art should understand the applicability, appropriate concentrations, and compatibility issues of the various additives for a given application. By way of nonlimiting example, high concentrations of multivalent salts may adversely effect the efficacy of kinetic gas hydrate inhibitors described herein and should be considered when formulating a treatment fluid according to some embodiments of the present invention.

Some embodiments may involve inhibiting gas hydrate formation using kinetic gas hydrate inhibitors described herein. Some embodiments of the present invention may involve using kinetic gas hydrate inhibitors described herein in conjunction with transporting hydrocarbon fluids, storing hydrocarbon fluids, and/or producing hydrocarbon fluids.

Some embodiments of the present invention may involve adding kinetic gas hydrate inhibitors described herein to a fluid capable of producing gas hydrates. One skilled in the art should understand the fluid compositions that are capable of producing gas hydrates. By way of nonlimiting examples, high-pressure methane and liquid water may condense to form gas hydrates at temperatures below about 5° C.

In some embodiments, fluids capable of producing gas hydrates may be hydrocarbon fluids comprising water. In some embodiments, fluids capable of producing gas hydrates may be hydrocarbon fluids comprising at least trace amounts of water. In some embodiments, fluids capable of producing gas hydrates may be light hydrocarbons (e.g., methane) comprising at least trace amounts of water.

Some embodiments of the present invention may involve transporting a fluid capable of producing gas hydrates and comprising kinetic gas hydrate inhibitors described herein. In some embodiments, transporting fluids capable of producing gas hydrates and comprising kinetic gas hydrate inhibitors described herein may be through wellbores, through pipelines (above and/or ground), or any combination thereof. In some embodiments, transporting fluids capable of producing gas hydrates and comprising kinetic gas hydrate inhibitors described herein may be from a subterranean formation to the surface of a wellbore and/or to a pipeline. As used herein, the term "pipeline" refers to a tube or system of tubes used for transporting hydrocarbon fluids from the field (e.g., a wellbore) or gathering system to another location, e.g., a refinery.

In some embodiments, transporting fluids capable of producing gas hydrates and comprising kinetic gas hydrate inhibitors described herein may be at reduced temperatures, e.g., about 5° C. or below.

Some embodiments of the present invention may involve storing a fluid capable of producing gas hydrates and comprising kinetic gas hydrate inhibitors described herein. In some embodiments, storing fluids capable of producing gas hydrates and comprising kinetic gas hydrate inhibitors described herein may be at reduced temperatures, e.g., about 5° C. or below.

Some embodiments of the present invention may involve using kinetic gas hydrate inhibitors described herein in conjunction with subterranean operations. Such operations may include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, sag control operations, and the like. The methods and compositions of the present invention may be used in full-scale operations or pills. As used herein, a "pill" is a type of relatively small volume of specially prepared treatment fluid placed or circulated in the wellbore.

Some embodiments may involve adding kinetic gas hydrate inhibitors described herein to treatment fluids. Some embodiments may involve treating a subterranean formation with treatment fluids comprising kinetic gas hydrate inhibitors described herein. Some embodiments may involve introducing treatment fluids comprising kinetic gas hydrate inhibitors described herein into a wellbore penetrating a subterranean formation. Some embodiments may involve producing hydrocarbon fluids comprising kinetic gas hydrate inhibitors described herein from a subterranean formation.

Subterranean formation suitable for using compositions and methods of the present invention may include, but not be limited to, formations having at least one zone about 5° C. or less, more preferably formations having at least one zone about −10° C. or less, deep sea formations, formations comprising permafrost, and the like, or any combination thereof.

Pipelines suitable for using compositions and methods of the present invention may include, but not be limited to, pipelines having at least a portion of pipeline being about 5° C. or less, more preferably formations having at least one zone less than about −10° C., pipelines at least partially located in deep sea areas, pipelines at least partially located in arctic areas (e.g., at least portions of Alaska, Canada, Russia, Siberia, and similar regions), and the like, or any combination thereof. Further, suitable pipelines may be at least in part above ground, below ground, underwater, or any combination thereof.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of drilling, the method comprising:
providing a drilling fluid comprising a base fluid and a kinetic gas hydrate inhibitor, the kinetic gas hydrate inhibitor comprising a rubber latex and a heterocyclic compound comprising nitrogen;
drilling a wellbore using the drilling fluid, the wellbore penetrating at least one zone of a subterranean formation that is at about 5° C. or less; and
allowing the kinetic gas hydrate inhibitor to inhibit gas hydrate formation in at least a portion of the wellbore.

2. The method of claim 1, wherein the kinetic gas hydrate inhibitor further comprises emulsion-polymerized copolymers of 1,3-butadiene and styrene.

3. The method of claim 1, wherein at least a portion of the heterocyclic compound comprising nitrogen is poly(vinyl pyrrolidone) in the form of nanoparticles having an average particle size less than about 1000 nm.

4. The method of claim 1, wherein at least a portion of the heterocyclic compound comprising nitrogen is poly(vinyl pyrrolidone) in the form of nanoparticles having an average particle size less than about 400 nm.

5. The method of claim 1, wherein at least a portion of the heterocyclic compound comprising nitrogen is crosslinked poly(vinyl pyrrolidone).

6. The method of claim 1, wherein the kinetic gas hydrate inhibitor is at about 0.0025% to about 5% by volume of the treatment fluid.

7. The method of claim 1, wherein the at least one zone of the subterranean formation is about −10° C. or less.

8. A method of drilling, the method comprising:
providing a drilling fluid comprising a base fluid and a kinetic gas hydrate inhibitor, the kinetic gas hydrate inhibitor comprising (1) a heterocyclic compound comprising nitrogen and (2) emulsion-polymerized copolymers of 1,3-butadiene and styrene;
drilling a wellbore using the drilling fluid, the wellbore penetrating at least one zone of a subterranean formation that is at about 5° C. or less; and
allowing the kinetic gas hydrate inhibitor to inhibit gas hydrate formation in at least a portion of the wellbore.

9. The method of claim 8, wherein at least a portion of the heterocyclic compound comprising nitrogen is poly(vinyl pyrrolidone) in the form of nanoparticles having an average particle size less than about 1000 nm.

10. The method of claim 8, wherein at least a portion of the heterocyclic compound comprising nitrogen is poly(vinyl pyrrolidone) in the form of nanoparticles having an average particle size less than about 400 nm.

11. The method of claim 8, wherein at least a portion of the heterocyclic compound comprising nitrogen is crosslinked poly(vinyl pyrrolidone).

12. The method of claim 8, wherein the kinetic gas hydrate inhibitor is at about 0.0025% to about 5% by volume of the treatment fluid.

13. The method of claim 8, wherein the at least one zone of the subterranean formation is about −10° C. or less.

* * * * *